United States Patent [19]

Yamaji et al.

[11] 4,116,478
[45] Sep. 26, 1978

[54] SEPARATION-PREVENTIVE PIPE JOINT

[75] Inventors: Tadao Yamaji; Toshi Nakajima; Takao Sagara, all of Amagasaki, Japan

[73] Assignee: Kubota, Ltd., Osaka, Japan

[21] Appl. No.: 829,605

[22] Filed: Sep. 1, 1977

[30] Foreign Application Priority Data

Sep. 13, 1976 [JP] Japan .................. 51-110112

[51] Int. Cl.$^2$ .............................................. F16L 21/04
[52] U.S. Cl. ................................. 285/302; 285/321; 285/374
[58] Field of Search ............... 285/302, 321, 374, 348

[56] References Cited
U.S. PATENT DOCUMENTS

| | | | |
|---|---|---|---|
| 1,204,728 | 11/1916 | Arena | 285/302 |
| 1,363,974 | 12/1920 | Heylman | 285/302 |
| 3,135,363 | 6/1964 | Bourassa | 285/302 X |
| 3,405,957 | 10/1968 | Chakroff | 285/321 X |
| 3,434,745 | 3/1969 | Jackman | 285/321 X |
| 3,712,648 | 1/1973 | Clifford | 285/374 X |
| 3,783,178 | 1/1974 | Philibert et al. | 285/302 X |
| 3,941,410 | 3/1976 | Miyaoka | 285/342 X |

Primary Examiner—Thomas F. Callaghan
Attorney, Agent, or Firm—Joseph W. Farley

[57] ABSTRACT

A spigot is inserted into a socket, with a seal packing pressed from the opening side of the socket into an annular space defined between the socket and the spigot, a lock ring fitted in an annular groove formed in the inner peripheral surface of the pocket inwardly of the seal packing, and an engaging projection provided on the outer periphery of the front end of the spigot for axial engagement with the lock ring. The lock ring is a split lock ring which can be inserted from the annular space between the socket and the spigot toward the innermost part of the socket and has a diametrically expanding force. The depth of the annular groove is controlled so as to allow the radially inner region of the lock ring fitted in the groove to engage the engaging projection. A back-up ring is disposed between the seal packing and the split lock ring and the mutual abutting surfaces of the split lock ring and back-up ring are conical surfaces tapering toward the front end of the spigot.

8 Claims, 7 Drawing Figures

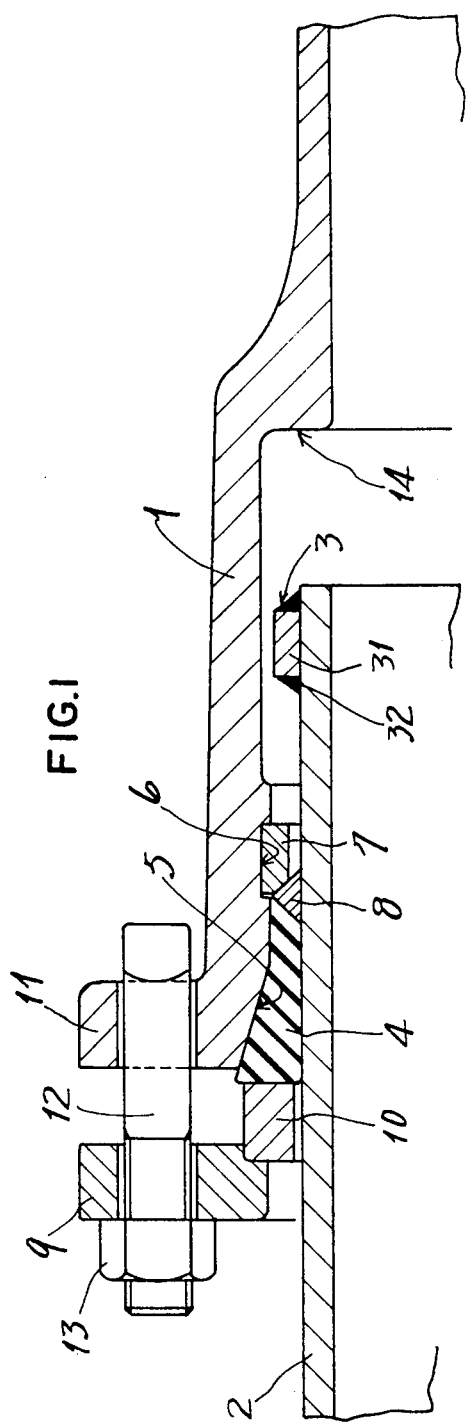
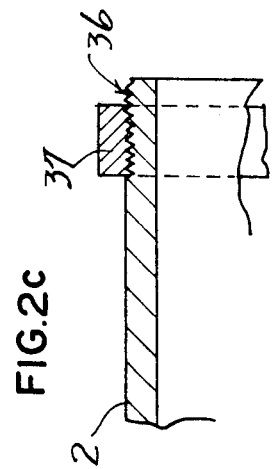
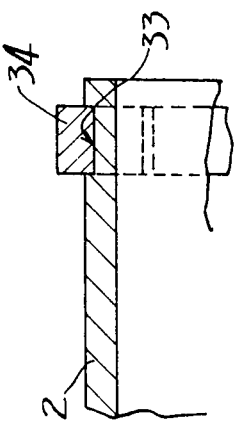
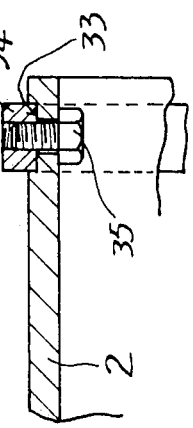

SEPARATION-PREVENTIVE PIPE JOINT

The present invention relates to a separation-preventive type pipe joint, and more particularly it relates to an earthquake-resistant pipe joint, wherein a spigot is inserted into a socket, with a seal packing pressed from the opening side of the socket into an annular space defined between the socket and the spigot, a lock ring fitted in an annular groove formed in the inner peripheral surface of the socket inwardly of said seal packing, and an engaging projection provided on the outer periphery of the front end of the spigot for axial engagement with said lock ring. The invention is advantageous particularly when applied to a pipe joint for small-diameter pipes.

The earthquake resisting function is achieved in such a manner that while axial movement between the socket and the spigot in a fixed range is allowed, mutual slip-off therebetween due to a movement exceeding the limit is securely prevented. Joints having such function have heretofore been proposed, including a type wherein a projection is provided on the front end of the spigot while a lock bolt engageable with said projection is screwed into a threaded hole in the socket from the outer surface of the socket, and another type wherein a lock ring fitted in an annular groove formed in the inner peripheral surface of the socket is diametrically contracted by a lock bolt so as to be engageable with a projection on the front end of the spigot. However, since threaded hole for said lock bolt extends through the outer surface of the socket at a position inward of a seal member which is interposed between the socket and the spigot, there is a danger of the pipeline fluid leaking through the clearance between the threaded hole and the lock bolt. As a measure for eliminating such drawback, U.S. Pat. No. 3,941,410 has already been proposed. According to a pipe joint disclosed in that patent, the sealing capability for prevention of leakage of the pipeline fluid is superior, and even if the pipe joint is applied to medium and large diameter pipes subjected to a large slipping-off force against the pipe joint, and is flexed between the socket and the spigot in such a manner as to produce uneven circumferential contact between the lock ring and the projection, the engagement between the lock ring and the projection on the front end of the spigot is positively maintained, thus providing a reliable slipping-off preventing function. In an aspect of construction, however, the need for forming a large number of threaded holes increases the number of steps of forming the socket and the need for screwing a number of bolts thereinto requires much labor in the connecting operation, and additionally, the number of parts is increased, thus, causing various disadvantages from the standpoint of production cost and connecting operation.

Further, a pipe joint capable of eliminating such disadvantages has been proposed in U.S. patent application Ser. No. 686,546, filed May 14, 1976 now U.S. Pat. No. 4,082,321. The arrangement thereof includes a split lock ring provided at its opposite ends with overlap portions capable of overlapping each other axially of the pipes and is such that with the opposite ends of said split lock ring drawn toward each other, an engaging member engageable over the opposite ends of said split lock ring at said overlap portions is inserted through a clearance defined between the socket and the spigot and said split lock ring is closely fitted on the spigot. With this arrangement, all the disadvantages described above can be eliminated and the sealing capability and slipping-off preventing function are satisfactory. However, this does not necessarily mean that the arrangement and operation are very simple. More particularly, although such arrangement is necessary in the case of medium and large diameter pipes since a large slipping-off force acts in this case, pipe joints for small diameter pipes with diameters of not more than about 700 mm leave much room for simplification of the arrangement and operation.

The invention has for its object the provision of a slipping-off preventing pipe joint which is superior in the sealing capability and has a sufficient necessary slipping-off preventing force and yet is simple in construction and in connecting operation and advantageous particularly for small diameter pipes.

In an aspect of arrangement, the invention provides a separation-preventive pipe joint comprising a socket, a spigot inserted in said socket, a seal packing pressed into an annular clearance defined between said socket and spigot fitted together, a lock ring engaged with and held by the inner peripheral surface of the socket at a position inward of said seal packing, and an engaging projection provided on the outer peripheral surface of the front end of the spigot and adapted to be engageable with said lock ring in the direction of the pipe axis from the innermost part of the socket, said pipe joint being characterized in that it comprises a split lock ring which is split at a single place on the circumference and has a diametrically expanding force and which is capable of being inserted toward the innermost part of the socket from the annular space between the socket and spigot, and an annular groove formed in the inner peripheral surface of the socket inwardly of the seal packing, the depth of said annular groove being such that the radially inner region of said split lock ring fitted therein is allowed to engage said engaging projection in the direction of the pipe axis.

According to a desirable embodiment of the invention, in order that the force with which said seal packing is pressed in may effectively act as a seal surface pressure and that the surface of said seal packing may not be damaged as a result of partial contact of said surface with the lateral surface of the split lock ring, a back-up ring is interposed between said split lock ring and said seal packing in such a manner that the opposite lateral surfaces of said back-up ring abut against the two.

According to another desirable embodiment of the invention, the abutting surfaces of the split lock ring and back-up ring are shaped to taper toward the front end of the spigot so that even in the case of the split lock ring being subjected to a large slipping-off force or to a circumferentially deviated slipping-off force, the split lock ring may not be separated from the annular groove. Thus, when a slipping-off force acts on the split lock ring in the direction of the pipe axis, there is produced a component force due to the tapering abutting surfaces which tends to diametrically expand the split lock ring to urge it against the bottom surface of the annular groove.

According to an embodiment of the invention, the engaging projection on the front end of the spigot is in the form of a split or non-split ring which is separate from the pipe proper and which is fixed to the outer peripheral surface of the front end of the spigot. In a pipe joint construction according to the invention, when it is desired to increase the area of the surface for engagement between the split lock ring and the engaging projection to achieve reliable engagement therebetween, this may be achieved by increasing the radial width of the annular space between the socket and the spigot and increasing the extent of projection of the engaging projection so as to be close to said width while decreasing the depth of the annular groove. However, the depth of the annular groove is a quantity necessary for holding the split lock ring. Therefore, it is necessary to increase the width of the annular groove and hence the height of the engaging projection. In the case of a centrifugally cast pipe, it would be difficult to provide such engaging projection on the outer peripheral surface of the spigot by integral casting. It is more practical to fix a separate ringlike member to the outer periphery of the spigot. Various methods of securely fixing a ringlike member of relatively large height to the outer periphery of the spigot may be employed, including welding, threadedly fitting the ringlike body on the outer peripheral surface of the spigot, bolting the ringlike member to the outer peripheral surface of the spigot, and combinations or modifications thereof.

Other numerous features and merits of the invention will be readily understood from the following description of preferred embodiments of the invention, when taken in conjunction with the accompanying drawings, in which:

FIG. 1 is a longitudinal section of a pipe joint according to a preferred embodiment of the invention;

FIGS. 2a through 2d are longitudinal sections showing modified constructions of an engaging projection on the front end of a spigot;

Figure 3:
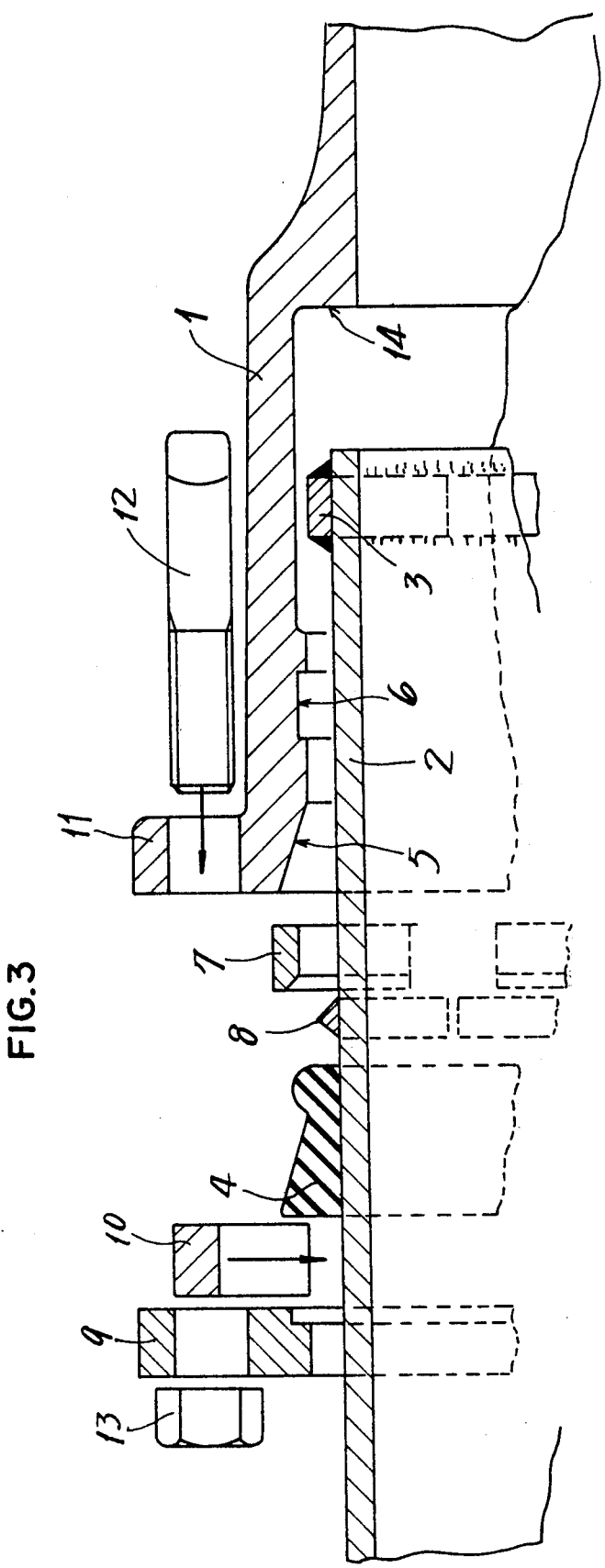
FIG. 3 is a longitudinal section showing the condition of the FIG. 1 pipe joint prior to assembly.

Referring to FIG. 1, the numeral 1 designates a socket and 2 designates a spigot which has an annular engaging projection 3 formed on the front end thereof. The projection 3 is in the form of a ringlike member of ductile cast iron or steel fixed to the spigot 2 by welding. In addition, this projection may be formed integrally with the spigot 2. On the other hand, the inner surface of the socket 1 is formed with a taper surface 5 adjacent the open end thereof for positioning a seal packing 4 and is also formed with an annular groove 6 inwardly thereof. Designated at 7 is a lock ring engageable with the projection 3 on the spigot 2, said lock ring being split at a place on the circumference, having a diametrically expanding force and fitted in the annular groove 6. The material of the lock ring 7 is ductile cast iron or steel. Further, the lateral surface of the lock ring 7 facing the opening side of the socket tapers toward the innermost part of the socket, i.e., toward the front end of the spigot, and a back-up ring 8 triangular in cross-section adapted to abut against said taper surface is interposed between the lock ring 7 and the seal packing 4. The back-up ring 8 is made of hard rubber, hemp or steel and formed as a single unit or split at a place on the circumference. Designated at 9 is a gland for pressing the seal packing 4 through an intermediate ring 10 which may be split at a place or a plurality of places on the circumference. The gland 9 is attached to a flange 11 on the socket 1 by inserting T-shaped bolts 12 into holes formed in said flange and in said gland 9 and applying nuts 13 to said bolts, and by turning the nuts 13 to tighten the bolts 12, a compressive force acts on the seal packing 4, thereby providing a sealing capability between the socket 1 and the spigot 2.

According to such arrangement, the movement of the projection 3 on the front end of the spigot 2 is allowed between the innermost wall surface 14 of the socket 1 and the lock ring 7 and within this range of movement the axial movement of the socket 1 and the spigot 2 is also allowed. Engagement between the projection 3 and the lock ring 7 prevents slipping-off. Thus, the pipe joint has an earthquake-resisting function.

The connecting operation will be described with reference to FIG. 3. The gland 9, intermediate ring 10, seal packing 4, back-up ring 8 and split lock ring 7, in the order mentioned, are slipped on the spigot 2 from the front end of the latter and the spigot 2 is once placed in the socket 1. In this condition, the spigot 2 is then inserted into the socket 1. Pushing the split lock ring 7 axially into an annular space defined between the inner surface of the socket 1 and the outer surface of the spigot 2 results in the split lock ring 7 snapping into the annular groove 6 due to its diametrically expanding force. The back-up ring 8 and seal packing 4 are then axially pushed into said annular space, the intermediate ring 10 is applied to the back surface of the seal packing 4, the radially inner region of the gland 9 is brought into abutting engagement with the back side in the radially outer region of the intermediate ring 10, and the gland 9 and the flange 11 on the socket are fastened together by bolts 12 and nuts 13 to complete the connecting operation. In this way, the connecting operation can be completed without need for the worker to enter the pipe for operation, and the sealing capability is, of course, satisfactory.

Figure 4:
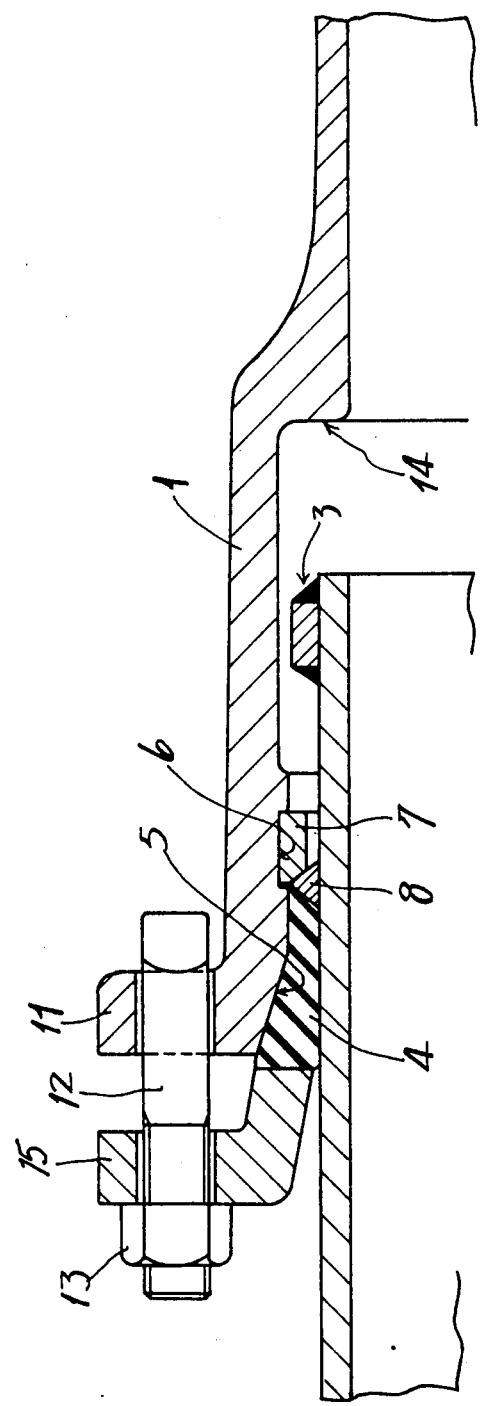
FIG. 4 is a longitudinal section showing a second embodiment of the invention wherein the separation-preventive pipe joint shown in FIG. 1 is modified.

In addition, the embodiment shown in FIGS. 1 and 3 uses the intermediate ring 10 which is split at a single place or a plurality of places on the circumference through which the gland 9 presses the packing 4, but if a gland 15 which is split at a plurality of places, generally two places, on the circumference is used, the intermediate ring 10 can be omitted, with the gland 15 directly applied to the back surface of the seal packing 4, as shown in FIG. 4.

If the projection 3 on the front end of the spigot 2 is designed to be attached to said front end just before the joint connecting operation or is designed to be of removable construction, it is possible to bring the inner peripheral surface of the gland close to the outer peripheral surface of the spigot 2, thereby bringing the radially inner region of the gland into abutment against substantially all the back surface of the seal packing 4. Therefore, the intermediate ring 10 can be omitted and the gland 15 may not be split into two segments.

The construction of the engaging projection 3 on the front end of the spigot will now be described in more detail with reference to FIGS. 1 and 2a through 2d. In FIG. 1, the engaging projection is formed to the front end of the spigot by fitting a ring member on the outer periphery of the front end of the spigot or winding a bandlike member on the outer periphery of the spigot to provide a ringlike member 31, and fillet-welding at least one lateral surface thereof to the region of the outer peripheral surface of the spigot adjacent thereto. When the welding is effected at the lateral surface of the member 31 axially opposite to the front end of the spigot, the surface of the weld 32 is a conical surface, so that upon engagement between the projection 3 and the split lock ring 7, said conical surface acts to urge the split lock ring against the bottom surface of the annular groove 6.

In addition, if there is a problem about the reliability of the weld 32, it is advisable to provide a shallow groove in the outer periphery of the spigot 2 and effect welding with the ringlike member 32 fitted in this groove.

In FIG. 2a, an annular groove 33 is provided in the outer peripheral surface of the spigot 2 and a split ringlike member 34 having a diametrically contracting force is fitted in said annular groove 33.

In FIG. 2b, said split ringlike member 34 is fixed in position at at least its opposite free ends by bolts 35 extending through the spigot wall. Of course, it may be bolted at suitable circumferential intervals. When bolting is employed, it is not always necessary for the ringlike member 34 to have a diametrically contracting force.

In FIG. 2c, an external thread 36 is cut in the outer periphery of the front end of the spigot 2 and a ring member 37 having an internal thread is threadedly fitted thereon.

In FIG. 2d, a ring member is fitted on the outer peripheral surface of the spigot or a bandlike member is wound on the outer periphery of the spigot to provide a ringlike member 38 which is then fixed on the spigot 2 by circumferentially spaced bolts 39 extending through the spigot wall.

In addition, in FIGS. 2b and 2d, it is not always necessary that the bolts 35 and 29 extend through the spigot wall for threaded engagement with ringlike members 34 and 38. Instead, if a flush bolt or a bolt with a recessed or socket head is used and the outer peripheral surfaces of the ringlike members 34 and 38 are counterbored so that the bolt heads may not project above said outer peripheral surfaces, then, reversely, it is possible for the bolt to extend through the ringlike member for threaded engagement with the spigot wall.

What is claimed is:

1. In a separation-preventive pipe joint comprising a socket, a spigot inserted in said socket, a seal packing pressed into an annular space defined between the mutually fitted socket and spigot, a split lock ring engaged with a groove in the inner peripheral surface of the socket inwardly of said seal packing, and an engaging projection engageable with said lock ring axially from the innermost part of the socket and provided on the outer peripheral surface of the front end of the spigot, the improvement wherein:

said split lock ring has a thickness less than the annular space defined between the socket and spigot and has a diametrically expanding force, and said groove has a depth less than the thickness of said split lock ring whereby said split lock ring is adapted to be inserted through said annular space into seating engagement with said groove, a portion of said split lock ring projecting from said groove in clearance relation with the outer peripheral surface of the spigot for engagement with said engaging projection;

a back-up ring is interposed between said split lock ring and said seal packing, said back-up ring having opposite lateral surfaces abutting said split lock ring and said seal packing; and, the abutting surfaces of said split lock ring and said back-up ring taper toward the front end of the spigot for retaining said split lock ring in seated engagement with said groove.

2. A pipe joint as set forth in claim 1, wherein said engaging projection is in the form of a ringlike member welded to the outer periphery of the spigot.

3. A pipe joint as set forth in claim 2, wherein at least the lateral surface of said ringlike member axially opposite to the front end of the spigot is fillet-welded to the outer peripheral surface of the spigot and the outer surface of the weld is a taper surface.

4. A pipe joint as set forth in claim 1, wherein said engaging projection is in the form of a split ring member fitted and fixed in an annular groove formed in the outer periphery of the front end of the spigot.

5. A pipe joint as set forth in claim 4, wherein said ring member has a diametrically contracting force.

6. A pipe joint as set forth in claim 4, wherein the opposite free ends of said ring member are fixed to the spigot by bolts.

7. A pipe joint as set forth in claim 1, wherein said engaging projection is in the form of a ring member threadedly fitted on the outer periphery of the front end of the spigot.

8. A pipe joint as set forth in claim 1, wherein said engaging projection is in the form of a ring member bolted to the outer peripheral surface of the front end of the spigot.